United States Patent
Carlton

(10) Patent No.: US 6,471,563 B1
(45) Date of Patent: Oct. 29, 2002

(54) METHOD OF CALLING GAME USING A DIAPHRAGM GAME CALL HAVING AN INTEGRAL RESONANCE CHAMBER

(75) Inventor: L. Wayne Carlton, Montrose, CO (US)

(73) Assignee: Hunter's Specialties, Inc., Cedar Rapids, IA (US)

(*) Notice: Subject to any disclaimer, the term of this patent is extended or adjusted under 35 U.S.C. 154(b) by 0 days.

(21) Appl. No.: 09/681,111

(22) Filed: Jan. 10, 2001

Related U.S. Application Data

(63) Continuation-in-part of application No. 09/086,637, filed on May 29, 1998, now Pat. No. 6,179,684.

(51) Int. Cl.⁷ ................................................. A63H 5/00
(52) U.S. Cl. ............................................ 446/202; 446/213
(58) Field of Search .................................. 446/207, 208, 446/209, 202, 213, 397, 416

(56) References Cited

U.S. PATENT DOCUMENTS

| | | |
|---|---|---|
| 1,052,525 A | 2/1913 | Smith |
| 2,093,453 A | 9/1937 | Kellotat |
| 3,583,094 A | 6/1971 | Tribell |
| 3,811,221 A | 5/1974 | Wilt |
| 3,815,283 A | 6/1974 | Piper |
| 4,138,800 A | 2/1979 | Lege |
| 4,218,845 A | 8/1980 | Evans et al. |
| 4,335,539 A | 6/1982 | Jones |
| 4,483,097 A | 11/1984 | Piper |
| 4,614,503 A | 9/1986 | Skoda |
| 4,752,270 A | 6/1988 | Morton |
| 4,888,903 A | 12/1989 | Knight et al. |
| 4,897,067 A | 1/1990 | Piper |
| 4,950,198 A | 8/1990 | Repko, Jr. |
| 4,960,400 A | * 10/1990 | Cooper ................. 446/207 |
| 4,976,648 A | 12/1990 | Meline |
| 5,061,220 A | 10/1991 | Cooper |
| 5,122,088 A | 6/1992 | Meline |
| 5,415,578 A | * 5/1995 | Jacobsen ............... 446/207 |
| 5,445,551 A | 8/1995 | Ady |
| 5,520,567 A | * 5/1996 | Jacobsen ............... 446/207 |
| 5,735,725 A | 4/1998 | Primos |
| 5,803,785 A | 9/1998 | Primos, Jr. et al. |
| 5,885,125 A | 3/1999 | Primos |
| 6,179,684 B1 | * 1/2001 | Carlton ................. 446/207 |

OTHER PUBLICATIONS

The Call Masters 1996–97 Catalog, pp. 1–2, Copyright 1995.*
Woods Wise Products 1996–97 Catalog.

* cited by examiner

Primary Examiner—Jacob K. Ackun
(74) Attorney, Agent, or Firm—Simmons, Perrine, Albright & Ellwood PLC

(57) ABSTRACT

A diaphragm game call having an integral dome-shaped resonant cavity coupled to and disposed above a frame containing a latex diaphragm and a flexible game call having a flexible sound chamber coupled to a multi-part mouthpiece assembly which includes therein a removable diaphragm with a dome-shaped resonant cavity and a method of operating the game call in which the diaphragm is placed between the caller's teeth.

3 Claims, 4 Drawing Sheets

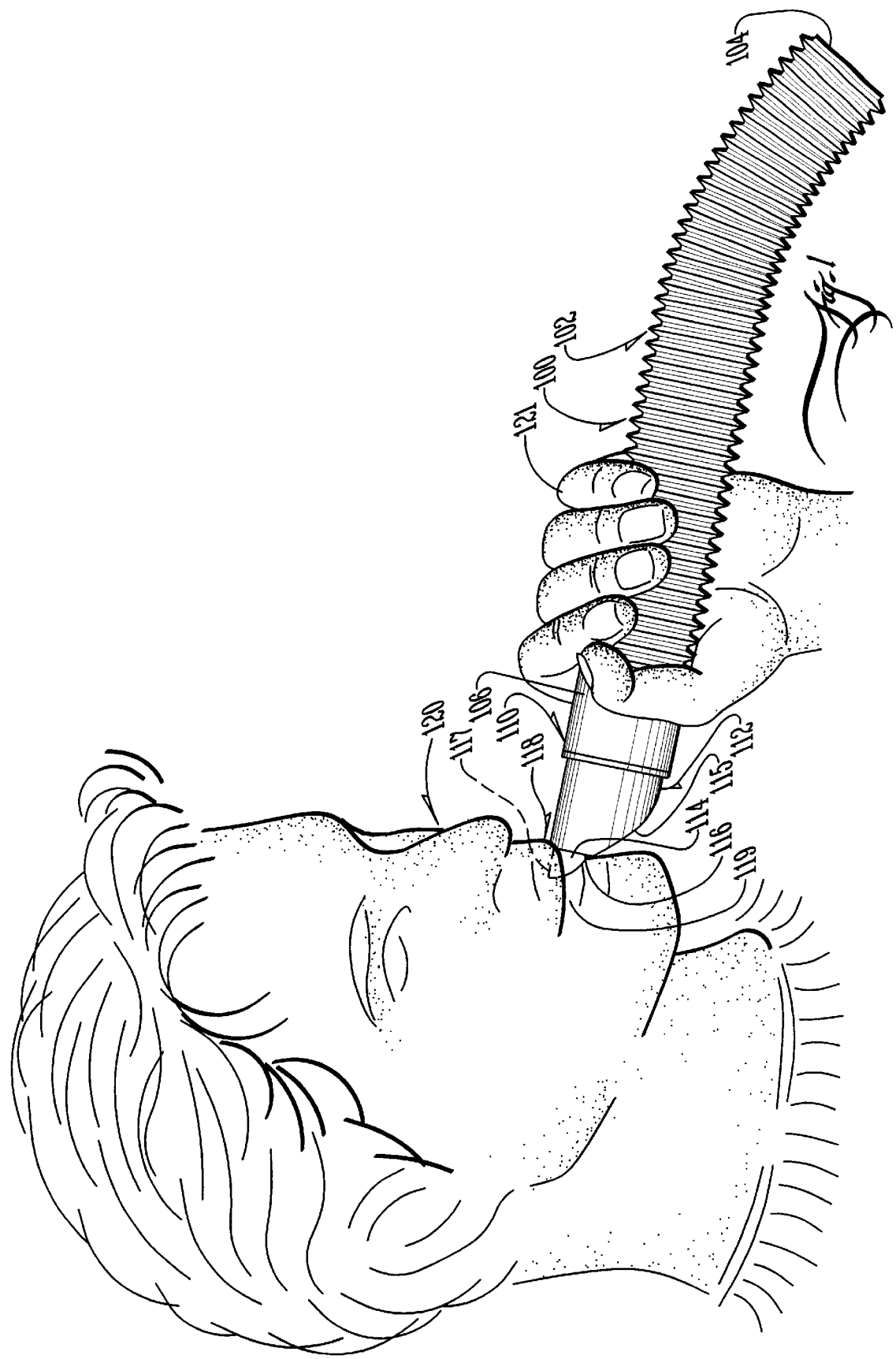

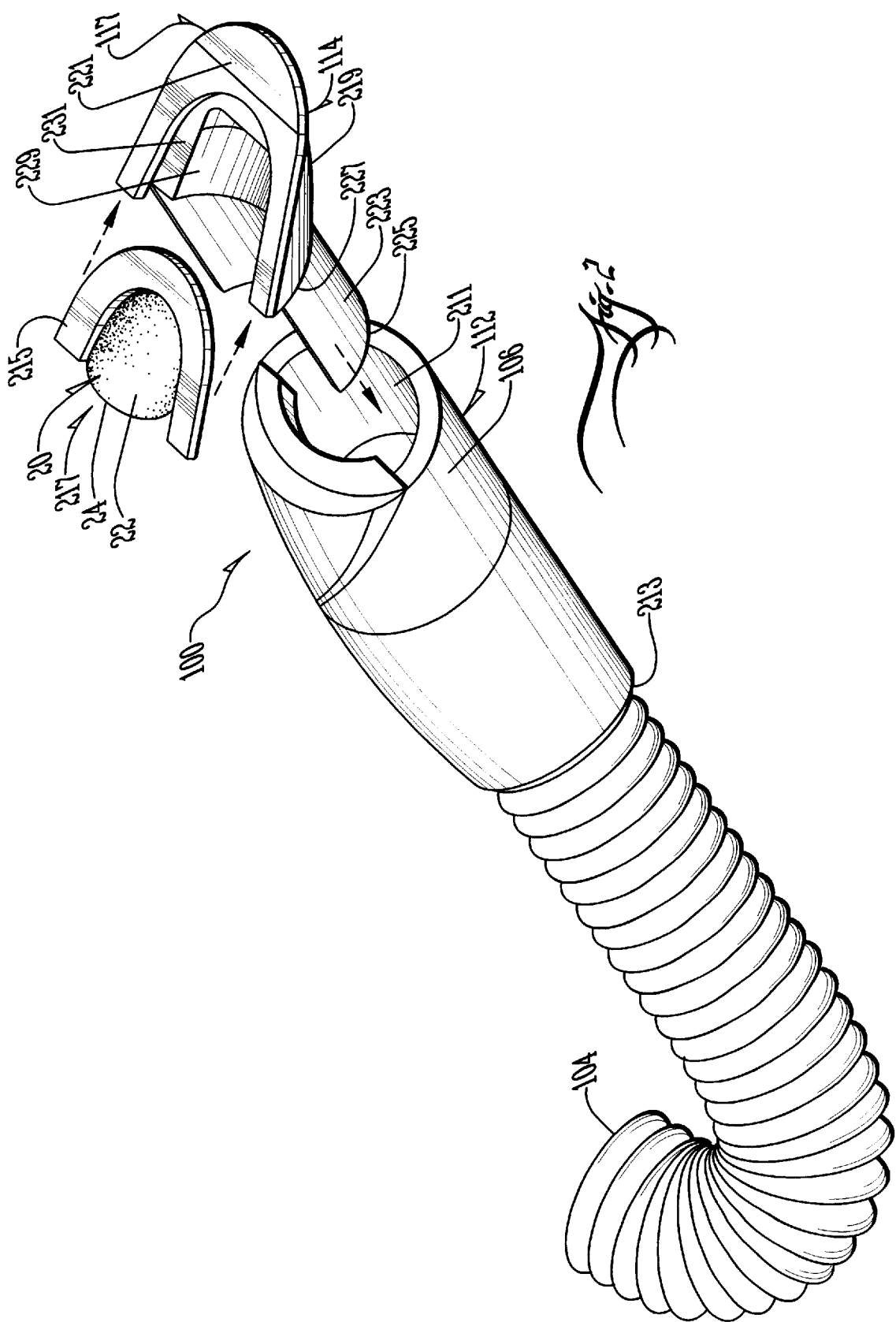

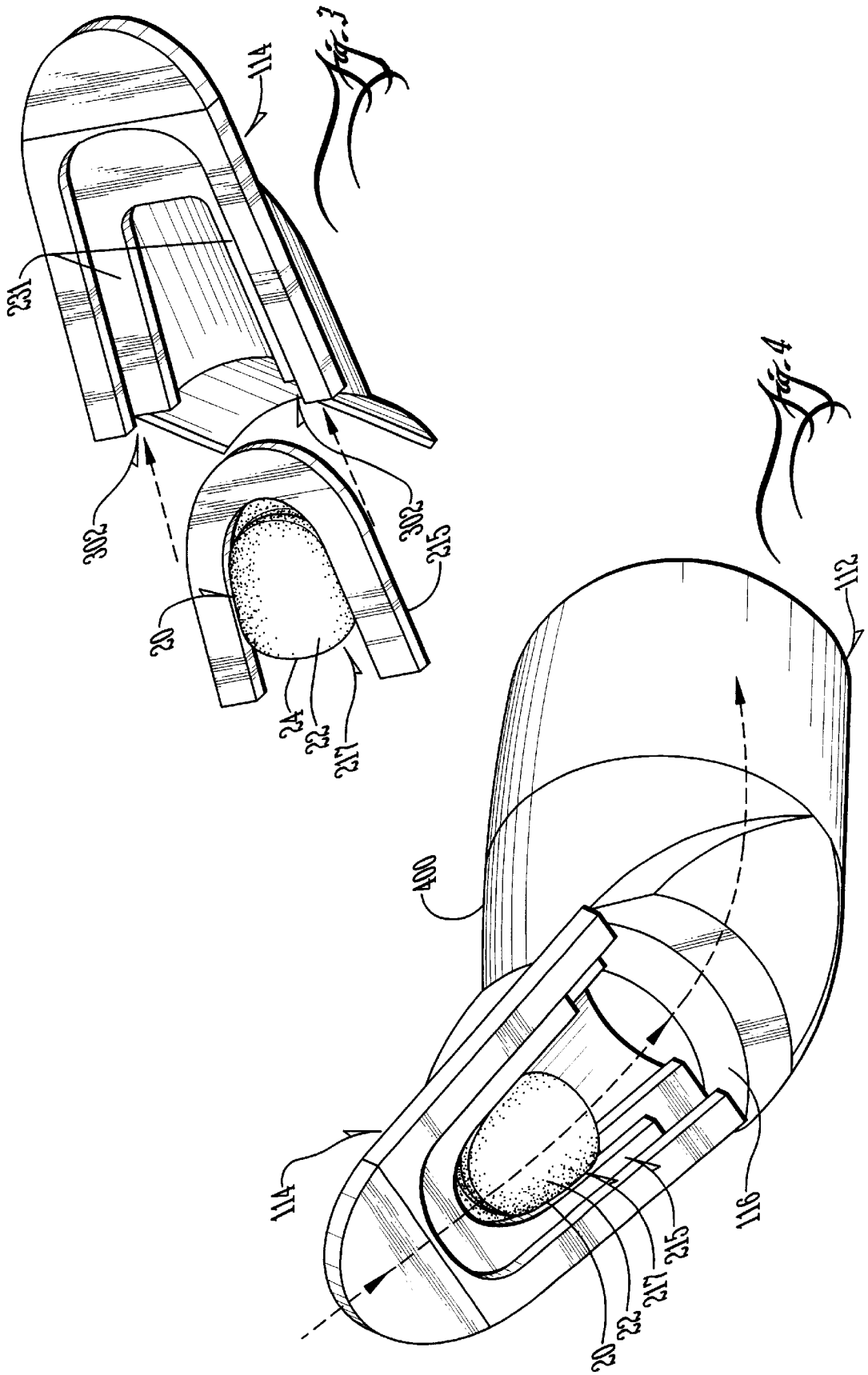

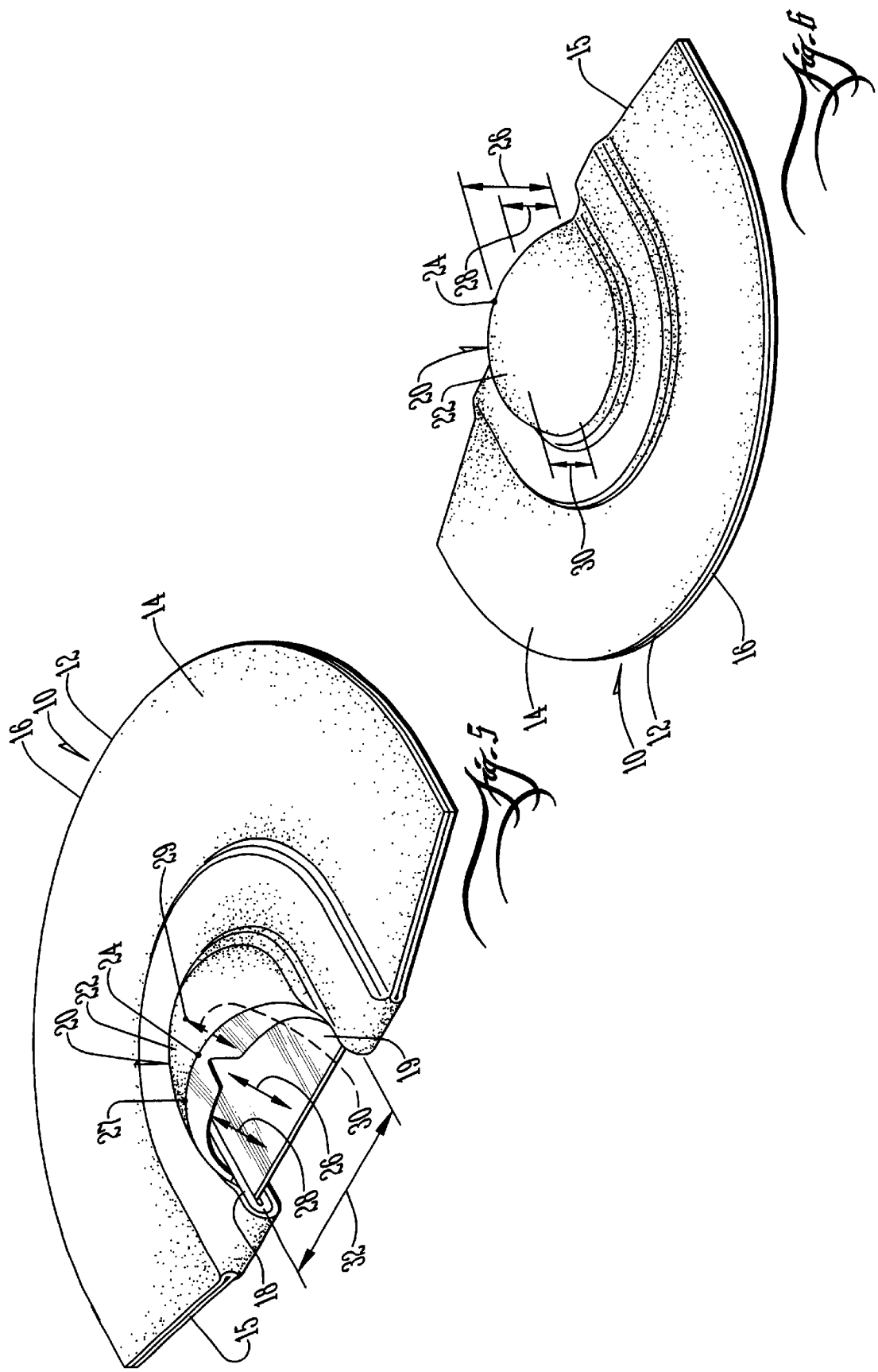

METHOD OF CALLING GAME USING A DIAPHRAGM GAME CALL HAVING AN INTEGRAL RESONANCE CHAMBER

CROSS REFERENCE TO RELATED APPLICATINS

This application is a continuation-in-part application of the application entitled "FLEXIBLE GAME CALL WITH REPLACEABLE DIAPHRAGM" by L. Wayne Carlton filed on May 29, 1998, and having Ser. No. 09/086,637, now issued as U.S. Pat. No. 6,179,684 B1, which is incorporated herein in its entirety by this reference.

BACKGROUND OF INVENTION

In the past, hunters have often used diaphragm game calls which consist of a simple latex reed in a taped "U"-shaped flexible frame. While these types of diaphragm calls and others have enjoyed considerable use in the past, they have several serious drawbacks. First of all, the typical diaphragm call forms the bottom end of a resonant chamber where the top end is the roof of the caller's mouth. This causes to exist a wide variation, across several callers, in the sounds produced by such calls, owing to the variations in the mouth shapes of these several callers. Similarly, because the typical diaphragm call will properly seal in only a small range of positions in a single caller's mouth, it is often difficult for a single caller to produce sounds having a wide tonal variety. Secondly, these diaphragm calls generally require the hunter or caller to possess a relatively high level of skill. The typical diaphragm call must be carefully sealed to the roof of the mouth of the caller before the desired sounds can be produced. Lastly, many hunters experience a gag reflex when attempting to seal a typical diaphragm call to the roof of their mouth.

Consequently, there exists a need for improvement in game calls which overcome the above-stated problems.

SUMMARY OF INVENTION

It is an object of the present invention to provide the hunter with a relatively easy method of generating more precise tones.

It is a feature of the present invention to include a resonant sound chamber integrally coupled with the diaphragm call.

It is an advantage of the present invention to provide for increased control over the size of the sound chamber about the latex reed.

It is another object of the present invention to provide an improved apparatus and method for blowing an "in-the-mouth" diaphragm call without causing the common gag reflexes and without engaging the roof of-the mouth of the caller.

It is a feature of the method of the present invention to grasp the diaphragm call between the teeth of the caller.

It is an advantage of the present invention to eliminate an otherwise present gag reflex in some hunters owing to contact with the roof of the hunter's mouth.

It is another feature of the present invention to place the call sideways within the caller's mouth.

It is another advantage of the present invention to provide for ways to produce variations in the sound output of diaphragm calls.

It is another feature of the invention to include the diaphragm of the present invention with a flexible sound chamber.

It is another feature of the present invention to include the diaphragm of the present invention as a removable diaphragm within the game call.

It is yet another advantage of the present invention to extend the useful life of the entire game call by allowing replacement of internal diaphragms.

The present invention is a method and apparatus for producing sound which is designed to satisfy the aforementioned needs, provide the previously stated objects, include the above-listed features, and achieve the already articulated advantages. In the present invention, the problems associated with limited tone precision, gag reflexes owing to engagement with the roof of the mouth, and difficulty in blowing a diaphragm call have been addressed.

Accordingly, the present invention is a method and apparatus for providing a sound of game which includes an "in-the mouth" diaphragm having a resonant chamber integrally disposed thereon and an elongated flexible sound chamber call using the integral resonant chamber diaphragm therein.

BRIEF DESCRIPTION OF DRAWINGS

The invention may be more fully understood by reading the following description of the preferred embodiments of the invention, in conjunction with the appended drawings wherein:

FIG. 1 is a perspective view of a call of the present invention showing the call immediately before it is placed in the mouth of an operator.

FIG. 2 is an enlarged exploded perspective view of the mouthpiece assembly of the call of FIG. 1 wherein the dashed lines show the direction of motion required for reassembly.

FIG. 3 is an exploded view of the diaphragm holder and diaphragm of FIG. 2 showing a slot for receiving the diaphragm having an integral resonant chamber.

FIG. 4 is a perspective view of the mouthpiece of FIG. 1 in an assembled configuration, with the dotted line included to show direction of airflow.

FIG. 5 is an enlarged reed side perspective view of the diaphragm of the present invention having the integral resonant chamber thereon.

FIG. 6 is another perspective view of the diaphragm of the present invention having an integral resonant chamber, which is shown from a different direction from that shown in FIG. 5.

DETAILED DESCRIPTION

Now referring to the drawings wherein like numerals refer to like matter throughout, and more particularly to FIG. 1, there is shown a perspective view of the game call of the present invention, generally designated 100, having a flexible sound chamber 102, which is preferably a flexible hose having an inside diameter of between 1 and 1½ inches. Such flexible tubes are generally available in the marketplace and are typically made of plastic, rubber, or other pliable material. Flexible sound chamber 102 is shown having an exhaust opening 104 at a distal end and a sound chamber intake end 106 at approximal end.

Call 100 is also shown having a mouthpiece assembly 110 which includes a mouthpiece barrel 112 having coupled thereto a diaphragm holder 114 which is disposed adjacent to a lip stop portion 116 of mouthpiece barrel 112, tip 117 of diaphragm holder 114 is inserted into the oral cavity 18 of operator 120 until lower lip 119 of operator 120 contacts lip stop 116. Mouthpiece barrel 112 may be a light-weight rigid hollow member which is made of plastic, wood, foam, or other suitable material. Barrel 112 is shown having a lip stop 116 and a chin relief area 115 disposed at a proximal end. Diaphragm holder 114 is preferably a rigid material which may be similar or identical to material of barrel 112. As with barrel 112, the material for diaphragm holder 114 is preferably rugged, rigid, non-porous, light-weight, and inexpensive. However, any material which has one or more of these characteristics could be substituted for certain applications.

Also shown in FIG. 1 is the hand 121 of an operator grasping the call 100.

Now referring to FIG. 2, there is shown an enlarged exploded perspective view of the call 100 of FIG. 1 wherein the dashed lines show the direction of motion required for reassembly. Barrel 112 is shown having a barrel intake 211 and a barrel exhaust 213. Also shown is C-ring 215, which is used to support diaphragm 217. Preferably, C-ring 215 is a bi-level C-ring which includes an area between each level for receiving and retaining a diaphragm disposed therein. C-ring 215 and diaphragm 217 are easily removed for replacement. Diaphragm 217 may be a plastic material, but other suitable materials, such as paper, rubber, or metal foil, could be substituted. Also C-ring 215 and diaphragm 217 could be adjusted and tuned to achieve different sound depending upon the desired effect. A resonant cavity dome 20 is shown disposed over diaphragm 217. Dome 20 is preferably a molded plastic member 22 which rises above the diaphragm 217 from the C-ring 215 to reach an apex 24 where it has a maximum height above the diaphragm 217. Adjustments in materials, dimensions, and positioning can be used to affect the output of the call. It should be understood that the C-ring 215 and dome 20 could be flipped over and be inserted in an upside down arrangement from what is shown in FIG. 3. It should be readily apparent that the dome 20 essentially creates a second smaller sound chamber within a larger sound chamber. Diaphragm holder 114 is shown having a top side 219 and a bottom side 221 and further having a diaphragm holder shank 223 having a shank distal end 225 and a shank proximal end 227. Diaphragm holder 114 is shown having a tone trough 229 disposed internally therein and further having a ring ledge 231 for receiving C-ring 215. Call 100 is designed to provide substantial airflow over the diaphragm when the call is blown.

Now referring to FIG. 3, there is shown an exploded view of the diaphragm holder and diaphragm of FIG. 2 showing the slot therein for receiving the diaphragm.

The dotted lines represent the direction of motion required of the C-ring 215 for reassembly in which C-ring 215 would rest upon ring ledge 231 and would be placed within slot 302 of the diaphragm holder 114.

Now referring to FIG. 4, there is shown a perspective view of the mouthpiece assembly of FIG. 1 in an assembled configuration with the dotted line indicating the direction of airflow during normal operation and further showing an air passage 400 which is bounded by the diaphragm 217, the C-ring 215, and the lip stop portion 116 of mouthpiece barrel 112.

In operation, the game call 100 is inserted into the oral cavity 118 of operator 120, so that lip 119 contacts lip stop 116 and diaphragm holder 114 is largely enclosed in oral cavity 118. The operator 120 expresses air outwardly and across diaphragm 217 and through air passage 400 and there on through the hollow portion of barrel 112 and the flexible sound chamber 102 and ultimately exiting game call 100 through exhaust opening 104 which is manipulated to point in different directions.

In operation, the call is assembled as follows: the diaphragm is slid into the diaphragm holder, which is inserted into the mouthpiece barrel, which is inserted into the flexible sound chamber.

Now referring to FIG. 5, there is shown an enlarged view of an "in-the-mouth" diaphragm call of the present invention, generally designated 10 having a peripheral edge 12 and a flexible tape top surface 14 which extends over a C- or U-shaped frame 18. Except for the resonant cavity dome 20 and how it is attached, deployed and used, the basic frame, diaphragm, and tape configurations are well known in the art. Dome 20 forms the top side of a small resonant cavity of fixed size and shape. In a typical prior art diaphragm call, the top part of the resonant cavity is formed by the roof of the mouth of the caller. The present invention creates a diaphragm call with a smaller sound chamber (the dome 20) inside a larger sound chamber (the usual sound chamber sealed by the tape and defined by the roof of the caller's mouth and the call). Generally, dome 20 is a molded member 22 approximately in the shape of ¼ of a spherical shell in that dome 20 has an apex 24 which has a maximum height 26 from the apex 24 to the diaphragm 19. The height 28 represents a height of the dome 20 at a first intermediate point 27 along the. surface of the dome 20 and between the apex 24 and the frame 18. Height 28 is less than maximum height 26. Height 30 represents a height at a second intermediate point 29, taken in an orthogonal relationship with respect to a line drawn from the apex 24 to first intermediate point 27. Height 30, like height 28, is less than the maximum height 26. While a spherical-shaped dome 20 is mentioned here, this is merely for convenience in the description. It should be understood that any non-spherical concave dome may be substituted. In fact, in a preferred embodiment, the maximum height 26 is less than a maximum dome width 32.

Dome 20 may be a separate piece that is taped to a typical C- or U-shaped frame, or it may be molded or otherwise fashioned to be integral with the frame 18. In either arrangement, it may be preferred to have the top surface 14 of the tape extend over the dome 20. Dome 20 may be rigid so as to maintain its shape and have a more precisely defined sound chamber. However, member 22 may be sufficiently pliable that it can be adjusted in shape by the caller to allow for variation in tones, as well as to assure that the dome 20 does not contact the roof of the mouth of the caller while it is used.

Now referring to FIG. 6, there is shown another perspective view of the diaphragm of FIG. 5 taken from a different direction.

In operation, the "in-the-mouth" diaphragm call 10 of the present invention can be used as follows: In one arrangement, the call 10 is placed transversely in the caller's mouth. The proximal edge 15 is along the side of the caller's mouth and is generally parallel with a central line from the caller's teeth to the caller's tonsils. In this unusual arrangement the dome 20 permits free vibration of the diaphragm. Prior art diaphragm calls would often not produce sound in such arrangements because the latex diaphragm would come in contact with the caller's teeth or the roof of the mouth thereby precluding normal operation of the call.

In another, more typical, arrangement, the call 10 is placed in the caller's mouth, so that the proximal edge 15 of the call 10 is in the front of the mouth generally behind the teeth of the caller. The distal edge 16 is then disposed deeper inside of the caller's mouth and extending therein. The flexible tape top surface seals the call 10 to the roof of the caller's mouth to form the large sound chamber. The apex 24 is disposed upwardly extending in a direction toward the roof of the mouth of the caller, but preferably not touching the roof of the mouth of the caller. The dome becomes the second sound chamber inside the larger sound chamber.

It is thought that the method and apparatus of the present invention will be understood from the foregoing description, and it will be apparent that various changes may be made in the form, construct, steps and arrangement of the parts and steps without departing from the spirit and scope of the invention or sacrificing all of the material advantages. The form herein described being merely a preferred or exemplary embodiment thereof.

What is claimed is:

1. A method of calling game comprising the steps of:

inserting a U-shaped diaphragm call, having a top side and a bottom side, in a mouth of a human;

said U-shaped diaphragm having a flexible diaphragm therein; placing the U-shaped diaphragm call near a front portion of said mouth;

sealing said flexible diaphragm to a roof of said mouth of said human with a flexible member about said flexible diaphragm;

said roof of said mouth, said flexible member and said flexible diaphragm defining a first sound chamber;

said U-shaped diaphragm call having an integral second sound chamber disposed therein;

said integral second sound chamber having a top surface thereof which is free from contact with said roof of said mouth;

causing air to flow over only the bottom side; and, causing said flexible diaphragm to move into said integral sound chamber and vibrate within said integral second sound chamber and thereby produce a sound for calling game.

2. A method of calling game comprising the steps of:

inserting a diaphragm and a first rigid and stationary sound chamber inside a human mouth;

creating a second sound chamber inside said human mouth, by creating a seal between a roof of said mouth and a periphery of said diaphragm; and, causing said diaphragm to vibrate inside said first rigid and stationary sound chamber and said second sound chamber.

3. A method of calling game comprising the steps of:

inserting a U-shaped diaphragm call, having a top side and a bottom side, in a mouth of a human;

said U-shaped diaphragm call having a flexible diaphragm disposed therein with a free end edge;

wherein said U-shaped diaphragm call has an attached rigid sound chamber dome into which said flexible diaphragm can move and vibrate to create sound;

placing the U-shaped diaphragm call so that said free end edge is substantially perpendicular to a width line extending across said mouth; and causing air to flow over the bottom side and forcing the flexible diaphragm to vibrate and produce a sound for calling game.

* * * * *

UNITED STATES PATENT AND TRADEMARK OFFICE
CERTIFICATE OF CORRECTION

PATENT NO.    : 6,471,563 B1
DATED         : October 29, 2002
INVENTOR(S)   : L. Wayne Carlton It is certified that error appears in the above-identified patent and that said Letters Patent is hereby corrected as shown below:

Column 2,
Line 62, please delete "approximal" and insert therefor -- a proximal --.
Line 67, please delete numeral "18" and insert therefor -- 118 --.

Signed and Sealed this

Twenty-fifth Day of March, 2003

JAMES E. ROGAN
*Director of the United States Patent and Trademark Office*

Disclaimer

6,471,563 — Wayne L. Carlton, Montrose, CO. METHOD OF CALLING GAME USING A DIAPHRAGM GAME CALL HAVING AN INTEGRAL RESONANCE CHAMBER. Patent dated Oct. 29, 2002. Disclaimer filed Jan. 29, 2004, by the assignee, Hunter's Specialties, Inc.

Hereby enters this disclaimer to all claims (1-3) of said patent.

*(Official Gazette May 24, 2005)*